Aug. 3, 1943.   N. B. BURKNESS   2,325,657
COMBINED FILTER, DEHYDRATOR, AND INDICATOR
Filed May 13, 1940    2 Sheets-Sheet 1
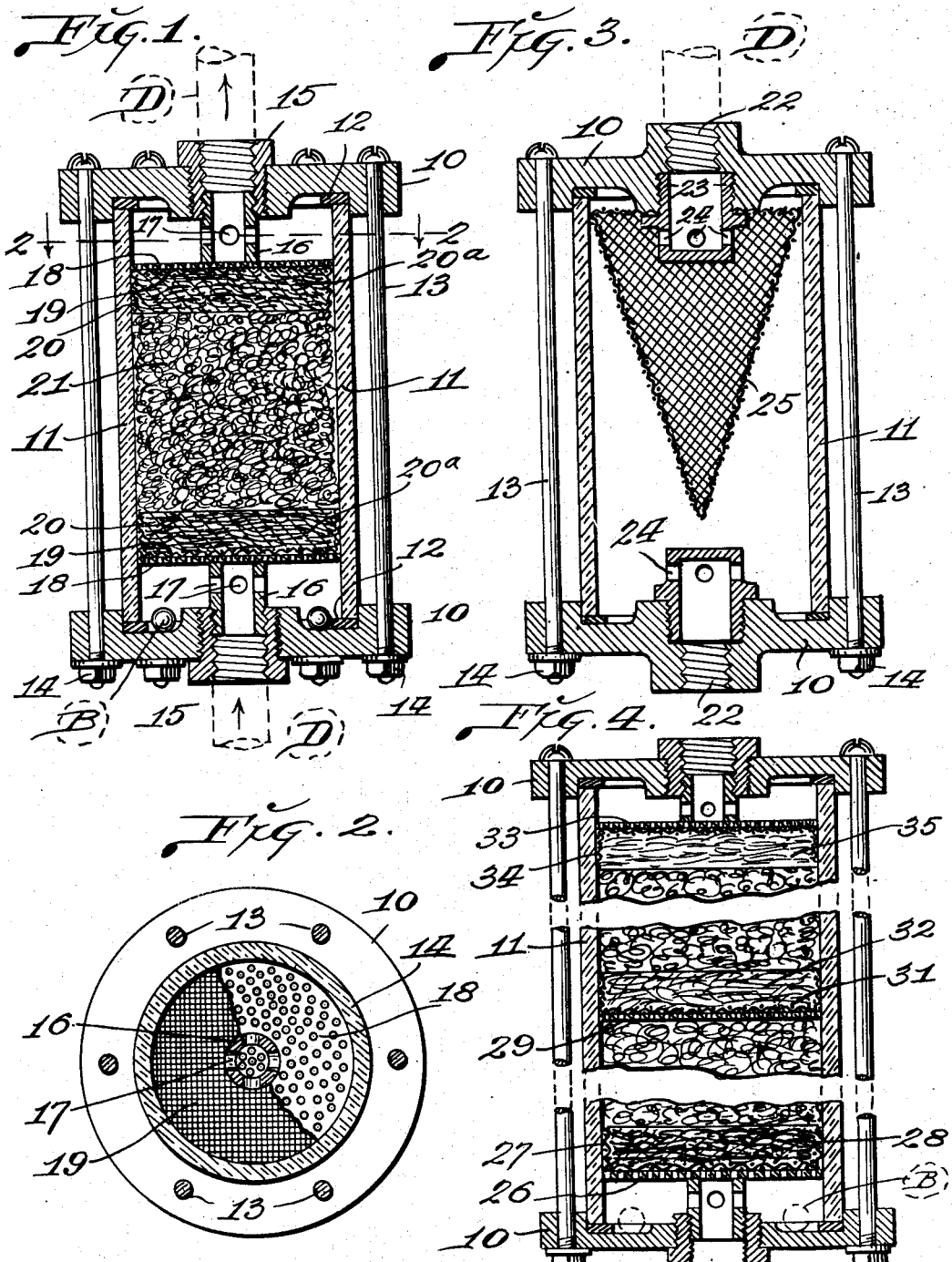
INVENTOR.
NEAL B. BURKNESS.
BY Martin P. Smith, ATTY.

Aug. 3, 1943.   N. B. BURKNESS   2,325,657
COMBINED FILTER, DEHYDRATOR, AND INDICATOR
Filed May 13, 1940   2 Sheets-Sheet 2
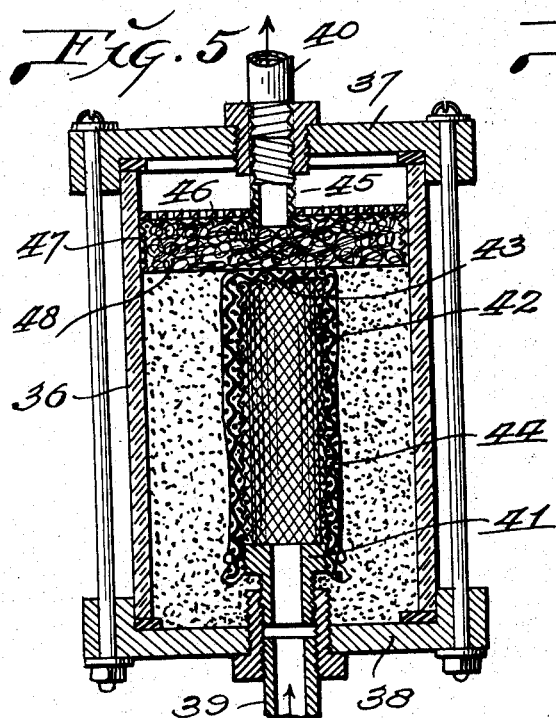
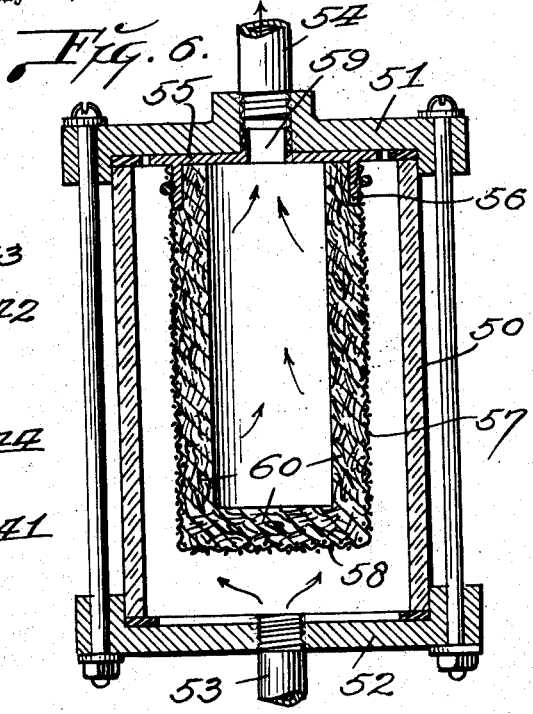
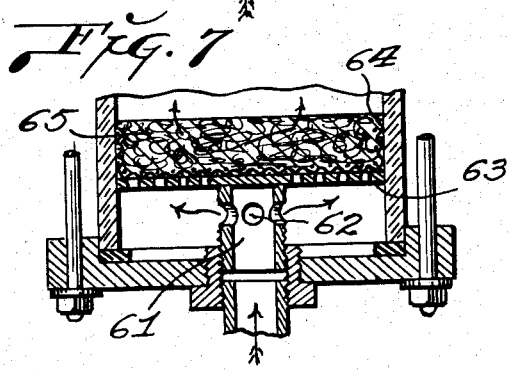
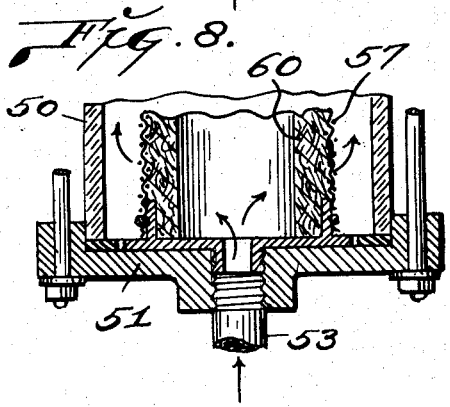
INVENTOR:-
NEAL B. BURKNESS.
By Martin P. Smith
ATTY.

Patented Aug. 3, 1943

2,325,657

UNITED STATES PATENT OFFICE 2,325,657

COMBINED FILTER, DEHYDRATOR, AND INDICATOR

Neal B. Burkness, Los Angeles, Calif.

Application May 13, 1940, Serial No. 334,839

6 Claims. (Cl. 210—134)

My invention relates to a device that is particularly designed for use in refrigeration, air-conditioning, and other similar systems and arts, where readily visible conditions of straining, filtering and dehydrating are important factors and the principal objects of my invention are, to provide a relatively simple, practical and inexpensive full vision device that may be conveniently located in a fluid flow pipe for thoroughly straining and/or filtering the fluid that flows through said device and the system with which it is associated, also for effecting dehydration of the fluid and enabling the results of such dehydration to be readily observed and to provide a device of the character referred to that provides a highly effective and positive volume and re-agent level indicator, and where the device is used in refrigeration systems, to show any variation and particularly the lack of refrigerant flow to the evaporator.

A further object of my invention is, to provide a device of the character referred to that may be easily and quickly changed through the use of interchangeable adaptors, so that it may serve for carrying out any one of its intended functions at one time, or in combination as may be required.

Further objects of my invention are, to provide a unitary and full vision device that will perform the functions of a strainer, filter, dehydrator, neutralizer, acid and refrigerant level or volume indicator, and also as an individual strainer and scale trap.

Further objects of my invention are, to provide a complete and full vision individual filter in which the clearness and purity or dilution of oil or the presence of foreign matter in solution or suspension, may be readily detected and said device being also adapted to function as an individual dehydrator in which the presence and amount of destructive element water is constantly visible, thereby enabling such element to be eliminated before trouble arises in the system or apparatus with which the device is associated.

A further object of my invention is, to provide a complete and full vision individual acid indicator, which involves the location of small, hard, polished ferrous metal balls in the inlet chamber and which balls become discolored, for instance, copper color, ashen gray, or black, in the presence of acid that may have accumulated in the fluid lines and upon ascertaining this destructive condition, acid neutralizing agents may be placed in the dehydrating compounds for absorption purposes or arrangements may be made for repairs.

A further object of my invention is, to provide a unitary and full vision device that may function as an individual refrigerant volume level indicator so that lack of refrigerant or its stoppage of flow to the evaporator or through controls or expansion valves, may be immediately noted by bubbling of the refrigerant or, as a result of the fluid level falling below the outgoing head of the indicator.

With the foregoing and other objects in view, my invention consists in certain novel features of construction and arrangement of parts that will be hereinafter more fully described and claimed and illustrated in the accompanying drawings in which:

Fig. 1 is a vertical section taken lengthwise through the center of a combined filter, dehydrator and indicator constructed in accordance with my invention.

Fig. 2 is a horizontal section taken on the line 2—2 of Fig. 1.

Fig. 3 is a vertical section similar to Fig. 1 and showing a modified form of the device.

Fig. 4 is a vertical section similar to Fig. 1 and showing a modified construction having three filtering elements of different capacities.

Fig. 5 is a vertical section similar to Fig. 1 and showing a further modified form of the device.

Fig. 6 is a vertical section similar to Figs. 1 and 5 and showing a further modification.

Fig. 7 is a detail section taken through the lower portion of the device and showing a modified arrangement.

Fig. 8 is a detail sectional view similar to Fig. 7 and showing a modified arrangement of the screen that is utilized in the device.

Referring by numerals to the accompanying drawings and particularly to the construction illustrated in Figs. 1 and 2, 10—10 designate heads which may be formed of any suitable material and which provide closures for a tube 11 of transparent material, for instance, glass or any of the so-called cellulosic plastics, and disposed between the ends of tube 11 and the heads 10 are conventional packing rings 12 that provide fluid pressure tight joints between said tube and heads.

Elongated bolts 13 or the like carrying on their threaded ends nuts 14 are utilized for clamping the heads against the ends of tube 11.

Screw seated in the central portions of the heads 10 are internally threaded nipples 15 that serve as points of connection for the flow ducts D of the refrigeration or other system with which the device is used and screw seated in the inner end portions of these nipples are tubes 16 that project short distances into the ends of the chamber within the transparent tube 11.

Formed in those portions of the walls of the tubes 16 that project into the chamber within the tube 11 are apertures 17. Positioned directly against the inner ends of the tubes 16 and preferably secured thereto are strainers 18, preferably perforated metal discs, each of which provides a support for a disc-shaped section 19 of reticulated material, such as woven wire screen of the desired mesh and projecting from the edge of said reticulated member away from the adjacent strainer 18 is a wall 20 of reticulated material, such as wire mesh.

Thus the disc 19 and wall 20 provide a shallow cup-shaped reticulated member and the space within the marginal wall is packed with a body 20a of suitable fibrous, filtering material, for instance, cotton, wool, asbestos, spun glass, steel wool, or the like.

The provision of cup-shaped reticulated receptacles for the bodies of fibrous, filtering material, 20a, enables said fibrous bodies to be more readily handled and to retain their packed condition within the reticulated members while the filter is being assembled and likewise while it is being disassembled in order to be cleansed.

In some instances and for certain specific purposes, the space between the reticulated cup-shaped members may be packed with clay, pulverized limerock, alumina, talcum, charcoal, silica gel, or the like.

The space within the tube 11 between the filtering bodies contained within the reticulated cups is filled with a body 21 of suitable fibrous, filtering material, or such filling may be chloride of lime and alumina.

When the form of filter just described is utilized and air-conditioning systems which depend upon the circulation of a liquid, the pipes D that provide ducts for the liquid are connected to the nipples 15 and the device is arranged so that the liquid flows upwardly therethrough.

While in operation, the liquid entering the bottom of the device passes through the lower one of the tubes 16 and discharges through the apertures 17 therein and from thence the liquid flows upwardly through the lower one of the strainers 18, the lower one of the filtering bodies 20a, thence through the filtering body 21, thence through the upper filtering body 20a, the upper strainer 18, thence through the apertures 17 in the upper one of the tubes 16 and from thence upwardly through the duct connected to the upper end of the device.

In the event of the development of any scale or sediment in the fluid circulation system with which the filter is associated, the larger particles of such scale and sediment will be strained from the fluid by the lower one of the strainers 18 and the smaller particles will be filtered from the liquid by the lower one of the filtering bodies 20a and by the large filtering body 21 located in the intermediate portion of the transparent tube 11.

Any scale or sediment that is strained from the fluid by the lower one of the strainers 18 will collect in the chamber within tube 11 above the lower head 10 and is readily visible through the lower portion of the transparent tube. The finer particles of scale or sediment that are filtered from the body 21 of filtering material will discolor the latter and such discoloration is readily visible through the transparent tube.

Any water that may enter and be carired by the circulating fluid medium will be adsorbed by the filtering body 21, thus dehydrating the fluid and such action may be readily noted through the transparent tube 11.

In the event of leakage of the fluid medium from the system with which the device is associated, such leakage will be indicated by the development and presence of bubbles within the chamber in the transparent tube 11 immediately below the upper one of the heads 10.

Either one or both of the filtering bodies 20a may be impregnated with a neutralizing agent that will be effective in neutralizing any acid in the system with which the device is used and which acid or acids, if permitted to circulate through the system, would tend to destroy the valves, valve seats, metal fittings and other essential parts of the system and its apparatus.

By locating a few small, hard, polished ferrous metal balls, such as B, in the chamber between the lower head 10 and screen 18, the device provides a readily visible acid indicator, for the presence of acid that may be accumulated in the fluid lines will as the fluid passes through the chamber below screen 18, cause the balls to turn copper color, ashen gray, or black, and by noting such condition, acid neutralizing agents may be placed in the dehydrating compounds for absorption or, proper repairs to the system may be made.

Certain acid conditions will turn the balls ashen gray or black and methyl chloride or ethyl chloride will turn the balls copper color.

The modified construction illustrated in Fig. 3 includes the heads 10 and transparent tube 11 clamped between said heads and formed in the centers of the heads 10 are threaded apertures 22 which receive the threaded ends of the pipes or tubes that provide ducts for the circulating fluid of the system with which the combined filter and indicator is used.

Screw seated in the under side of the upper head 10 and in the upper side of the lower head 10 and communicating with the opening 22 are nipples 23 that project into the ends of the chamber within the transparent tube 11 and each nipple being provided adjacent its inner end with apertures 24.

Supported within the upper portion of the chamber within tube 11 and clamped to the upper head 10 by the upper one of the nipples 23 is a strainer 25, preferably of woven wire.

This form of filter and indicator may be utilized in certain systems as a strainer and any scale, sediment or other foreign substances strained from the fluid passing through the device will accumulate within the chamber in tube 11 above the lower one of the head 10 where it is readily visible.

The modified construction illustrated in Fig. 4 and which is applicable for use in connection with certain systems employing circulating fluid mediums, includes the heads 10 that are clamped on the ends of the transparent tube 11 and which latter in this instance is somewhat longer than the tube used in the construction illustrated in Fig. 1.

In this construction, a strainer 26, preferably a perforated disc, is located in the lower portion of the chamber within the tube 11 and supported by said strainer is a shallow cup-shaped member 27, preferably composed of relatively coarse woven wire and which contains a body 28 of coarse, fibrous, filtering material.

Disposed within the intermediate portion of the tube 11 is a strainer 29, preferably a metal disc having perforations that are smaller than the perforations in disc 26 and filling the chamber within the transparent tube between said strainer 29 and the filtering body 26 is a filtering body 30, preferably of fibrous material. Supported by the perforated disc 29 is a shallow cup-shaped member 31 of woven wire and which is of a smaller mesh than that of the member 27. Member 31 contains a body 32 of fibrous, filtering material that is of finer texture than that of the fibrous, filtering body 28.

Arranged within the upper portion of the chamber within tube 11 and spaced apart from the upper head 10 is a strainer 33, preferably a metal disc having perforations that are smaller than the perforations in the intermediate strainer 29. Positioned against the under side of the strainer 33 is a shallow cup-shaped member 34, preferably composed of woven wire having a mesh smaller than that of the intermediate member 31 and filling said member 34 is a body 35 of fibrous, filtering material that is of finer texture than that of the body 32.

This construction provides what may be properly termed a three-stage filter and strainer, the action of which is readily visible at all times and such device being particularly effective in various systems employing circulating fluids that require filtering and straining, dehydration, the indication of any reagents in the circulating fluid and likewise for indicating any leakage of the circulating fluid.

The modified construction illustrated in Fig. 5 includes a transparent tube 36 disposed between an upper head 37 and a lower head 38, with an inlet duct 39 connected to the lower head and an outlet duct 40 connected to the upper head.

Suitably connected to the inlet duct 39 within the lower portion of the chamber in tube 36 is a nipple 41 to which is suitably secured the lower end of a tubular strainer 42, preferably formed from woven wire of small mesh closed at its upper end as designated by 43 and enclosing this screen is a comparatively thick wall 44 of fibrous filtering material, for instance, compacted felt.

Suitably connected to the outlet duct 40 is a nipple 45 carrying a perforated disc 46 that functions as a strainer and arranged on the under side thereof is a shallow cup-shaped reticulated member 47 that may be filled with suitable fibrous filtering material 48.

The space within the transparent tube 36 surrounding the screen 42 and filtering wall 44 may be empty when the device is used as a filter only or, for other purposes this space may be filled with clay, alumina, talcum, charcoal, silica jell, or the like.

Where this particular form of device is provided, a very effective strainer, screen and filter is produced, and by noting the condition of the body of material within the tube 36 surrounding the fibrous filtering wall 44, the clearness and purity or dilution of oil or the presence of foreign matter in solution or suspension may be readily detected.

In the modified construction illustrated in Fig. 6, a transparent wall 50 is clamped between upper and lower heads 51 and 52 respectively, with an inlet tube 53 leading through the lower head and an outlet tube 54 leading from the upper head. Removably applied to the under side of the upper head 51 within the chamber surrounded by transparent wall 50 is a disc 55 provided with a depending flange 56 and secured to the latter is the upper end of a depending reticulated wall 57, preferably woven wire. Secured to the lower end of this reticulated wall is a disc 58 of reticulated material, for instance, woven wire, the same being positioned a short distance above lower head 52.

Disc 58 has a centrally arranged outlet opening 59 that communicates with the inlet end of tube 54. Arranged within and directly against the reticulated wall 57 and lying on top of the reticulated disc 58 is a thick layer 60 of filtering material, for instance, felt.

When this device is in use, fluid such as liquid refrigerant discharges from inlet tube 53 into the chamber surrounded by transparent wall 50 and said fluid then flows through the reticulated wall 57, thence through the wall of filtering material 60 and said fluid after being thus filtered discharges through outlets 59 and 54.

Inasmuch as the wall 50 is transparent, the fluid entering the device may be readily observed before it passes through the reticulated wall 57 and filtering element 60.

By reversing the position of the device illustrated in Fig. 6 or turning the same upside down as illustrated in Fig. 8, the fluid to be filtered is delivered into the chamber that is surrounded by the layer of filtering material 60 and after passing therethrough will pass upwardly in the annular chamber between the reticulated wall 57 and transparent wall 50, so that the condition of the fluid after being filtered may be readily observed.

In the modified construction illustrated in Fig. 7, a nipple 61 that communicates with the inlet pipe connected to the lower head is provided in its upper portion with a series of openings 62 and positioned on top of said nipple is a strainer 63 comprising a perforated disc of thin sheet metal, on top of which is positioned a shallow cup-shaped member 64 composed of reticulated material, such as woven wire, and filling said cup-shaped member is a body 65 of suitable fibrous filtering material.

In this construction, the fluid entering the chamber beneath the strainer 63 may be readily observed before it passes upwardly through said strainer, the screen 64 and the filtering body 65.

Where the device is used for dehydration purposes, the filtering body or bodies may include an active ingredient which may be any of the common or special limes, clays, alumina, or other synthetic processed materials. During dehydration, any saturation is readily visible and can be quickly taken care of before the development of serious trouble.

The device serves as a positive volume and reagent level indicator and in refrigeration systems, the device will immediately show the loss of the refrigerant flowing to the evaporator.

The various parts entering into the construction of the device are readily interchangeable, thus greatly facilitating assembly, disassembly, and the arrangement of the parts so as to take care of any of the desired functions separately or in combination as required.

Thus it will be seen that I have provided a combined filter, dehydrator, neutralizer, and indicator, that is relatively simple in construction, inexpensive of manufacture, very effective in performing the functions for which it is intended and having the extremely desirable and important advantage of full visibility of all actions or changes taking place in the fluid that flows through the device.

It will be understood that minor changes in the size, form and construction of the various parts of my improved combined filter, dehydrator and indicator, may be made and substituted for those herein shown and described, without departing from the spirit of my invention, the scope of which is set forth in the appended claims.

I claim as my invention:

1. In a combined filter, dehydrator and indicator, a pair of heads, each having an opening, a transparent wall between said heads, perforated tubes seated in said heads around the openings therein and projecting into the chamber formed by said heads and transparent wall, interchangeable perforated plates removably positioned against the inner ends of said perforated tubes and interchangeable filtering bodies supported by said perforated plates.

2. A combined filter, dehydrator and indicator as set forth in claim 1 and with a third filtering body disposed between said interchangeable filtering bodies.

3. In a combined filter, dehydrator and indicator, a pair of heads, a transparent wall between said heads, one head having an inlet, the other head having an outlet, tubes seated in said heads and projecting inwardly from the inlet and outlet therein, the inner end portions of which tubes are perforated, perforated plates removably arranged within the chamber between said heads and transparent wall, which strainers bear against the inner ends of said perforated tubes, those portions of the transparent wall between the heads and perforated plates providing windows whereby the liquid entering the chamber within the transparent wall at one end and leaving the chamber at the other end may be readily observed and a body of filtering material filling the space within the transparent wall between said perforated plates.

4. A combined filter, dehydrator and indicator as set forth in claim 3 and with small bodies of hard, polished, ferrous metal contained in the chamber within the transparent wall with which the inlet opening communicates.

5. In a combined filter, dehydrator and indicator, a pair of heads, a transparent wall between said heads, one head having an inlet, the other head having an outlet, tubes seated in said heads and projecting inwardly from the inlet and outlet therein, the inner end portions of which tubes are perforated, strainers removably arranged within the chamber between said heads and transparent wall, which strainers bear against the inner ends of said tubes, those portions of the transparent wall between the heads and strainers providing windows whereby the liquid entering the chamber within the transparent wall at one end and leaving the chamber at the other end may be readily observed and a plurality of bodies of filtering material filling the space within said transparent wall between said strainers.

6. A combined filter, dehydrator and indicator as set forth in claim 5 and with small bodies of hard, polished, ferrous metal contained in the chamber within the transparent wall with which the inlet opening communicates.

NEAL B. BURKNESS.